3,383,187
LITHIUM BERYLLIUM ALUMINUM HYDRIDE AND PREPARATION THEREOF

George Rice, Montclair, and Robert Ehrlich, Morristown, N.J., assignors to Thiokol Chemical Corporation, Bristol, Pa., a corporation of Delaware
No Drawing. Filed May 25, 1966, Ser. No. 553,267
2 Claims. (Cl. 23—365)

ABSTRACT OF THE DISCLOSURE

The compound, lithium, beryllium aluminum hydride, useful as a reducing agent, and in solid propellants as a means of increasing performance, and a method for its preparation comprising reacting a beryllium dihalide with lithium aluminum hydride in an inert solvent until a reaction mixture is formed including a lithium halide, removing an halide, and contacting said reaction mixture with a trialkylamine until lithium beryllium aluminum hydride is formed.

This invention relates to the preparation of a new compound having a high active hydrogen content. More particularly, the invention pertains to lithium beryllium aluminum hydride and the preparation thereof.

Metallic hydrides are known to be excellent reducing agents. The product of this invention has a high active hydrogen content, making it useful also as a hydrogen source for organic synthesis. Another utility of the present invention is in the field of rocketry, in which art metallic compounds of the type disclosed are advantageously incorporated in solid propellants to increase performance.

It is accordingly an object of this invention to provide a novel compound heretofore unreported in the literature.

A further object of this invention is to provide a compound useful as a reducing agent, as an intermediate in chemical synthesis, and as an ingredient in rocket propellants.

The reaction of beryllium chloride with lithium aluminum hydride has been reported to give beryllium aluminum hydride. E. Wiberg and R. Bauer, Z. Naturforch., 6b, 171 (1951). The reaction is carried out in ethers because of the insolubility of lithium aluminum hydride in other solvents. It should be noted that the product of this reaction, beryllium aluminum hydride, has never been isolated. However, the precipitate formed by the reaction has been assumed to be lithium chloride.

It has been discovered that after addition of triethylamine to the filtrate from the above-described reaction, a white solid, lithium beryllium aluminum hydride, is precipitated slowly over a period of seven days. The reaction takes place at room temperature and atmospheric pressure. The reaction mechanism is unknown at the present time, but it is clear that in the previously known reaction of beryllium chloride with lithium aluminum hydride, the reaction does not go to completion under the conditions to be described hereinafter; otherwise no lithium would be available to form the product obtained.

The invention is illustrated by the following example:

EXAMPLE

To a suspension of 0.10 mole of $BeCl_2$ in 50 ml. of dry hexane and 100 ml. of dry diethyl ether, kept under nitrogen at room temperature, was added dropwise over a 40 minute period a solution of 0.20 mole of $LiAlH_4$ in 100 ml. of diethyl ether. Precipitation was immediate and the mixture was filtered as soon as the $LiAlH_4$ had been added. To the clear filtrate was added 0.25 mole of dry triethylamine. A white solid, lithium beryllium aluminum hydride, precipitated over a period of seven days. After filtering and drying at room temperature under high vacuum, the yield was 0.50 g. of product. The theoretical and experimentally determined percentages by weight of elements in the product were as follows:

Calculated for $LiBe(AlH_4)_3$. Theoretical: Li, 6.37; Be, 8.27; Al, 74.34; H, 11.02. Experimental: Li, 7.64; Be, 8.59; Al, 75.60; H, 11.00.

The X-ray diffraction pattern of the product is given in Table I. This pattern has not been previously reported.

Table I.—X-ray diffraction pattern of $LiBe(AlH_4)_3$

| $d$,A: | $I/I_o$ |
|---|---|
| 10.16 | 100 |
| 6.37 | 100 |
| 5.50 | 50 |
| 5.27 | 50 |
| 4.59 | 20 |
| 4.21 | 5 |
| 3.75 | 50 |
| 3.54 | 5 |
| 3.06 | 10 |
| 2.94 | 10 |
| 2.80 | 70 |
| 2.65 | 40 |
| 2.59 | 10 |
| 2.55 | 10 |
| 2.47 | 30 |
| 2.41 | 20 |
| 2.31 | 10 |
| 2.24 | 10 |
| 2.18 | 5 |
| 2.13 | 40 |
| 2.07 | 5 |
| 2.03 | 40 |
| 1.97 | 10 |
| 1.89 | 5 |
| 1.86 | 10 |
| 1.81 | 30 |
| 1.79 | 5 |
| 1.64 | 20 |
| 1.61 | 20 |
| 1.59 | 5 |
| 1.58 | 5 |
| 1.55 | 10 |
| 1.45 | 10 |
| 1.43 | 10 |
| 1.42 | 10 |
| 1.40 | 10 |
| 1.30 | 10 |
| 1.17 | 5 |
| 1.14 | 5 |

$d,A$ = Crystal lattice spacing in angstroms
$I$ = Observed intensity
$I_o$ = Reference intensity

What is claimed is:
1. The compound, $LiBe(AlH_4)_3$.
2. A method for preparing $LiBe(AlH_4)_3$ comprising contacting a beryllium dihalide with lithium aluminum hydride in an inert solvent until a reaction mixture including lithium chloride is formed, removing said lithium chloride from said reaction mixture, and contacting said reaction mixture with a trialkylamine until said LiBe(AlH$_4$)$_3$ is formed and isolating said product.

References Cited

Emeleus et al.: Advances in Inorganic Chemistry and Radiochemistry, vol. 8, 1966, Academic Press, New York, pp. 323–325 and 334.

Wood et al.: J. Electrochem. Soc., vol. 104, pp. 29–37 (1957).

MILTON WEISSMAN, *Primary Examiner.*

CARL D. QUARFORTH, *Examiner.*

L. A. SEBASTIAN, *Assistant Examiner.*